(12) United States Patent
Achleitner

(10) Patent No.: US 6,663,166 B2
(45) Date of Patent: Dec. 16, 2003

(54) BODY FOR A MOTOR VEHICLE AND A METHOD OF MAKING SAME

(75) Inventor: August Achleitner, Weil der Stadt (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/942,042

(22) Filed: Aug. 30, 2001

(65) Prior Publication Data

US 2003/0042753 A1 Mar. 6, 2003

(30) Foreign Application Priority Data

Aug. 30, 2001 (DE) .......................... 100 42 409

(51) Int. Cl.[7] .............................. B60J 5/04; B62D 25/04; B62D 27/00
(52) U.S. Cl. ............................. 296/146.6; 296/187.03; 296/187.12; 296/193.02; 296/193.05; 296/193.06
(58) Field of Search ................................. 296/189, 188, 296/203.03, 146.6, 29, 185, 187, 146.5, 203.01, 204

(56) References Cited

U.S. PATENT DOCUMENTS

| | | | |
|---|---|---|---|
| 3,944,278 A | | 3/1976 | Takahashi et al. |
| 4,428,599 A | * | 1/1984 | Jahnle .......................... 296/204 |
| 5,094,034 A | | 3/1992 | Freeman .................... 296/146.6 |
| 5,137,325 A | * | 8/1992 | Ohya ........................... 296/188 |
| 5,221,121 A | * | 6/1993 | Zichner et al. .............. 296/188 |
| 5,395,153 A | | 3/1995 | De Smet |
| 5,429,410 A | * | 7/1995 | Fleischer ................. 296/146.6 |
| 5,431,476 A | * | 7/1995 | Torigaki ..................... 296/188 |
| 5,806,917 A | * | 9/1998 | Townsend ................... 296/202 |
| 5,895,088 A | * | 4/1999 | Knott .......................... 296/188 |
| 5,908,216 A | * | 6/1999 | Townsend ................ 296/146.6 |
| 6,053,565 A | * | 4/2000 | Cho ............................ 296/188 |
| 6,059,355 A | * | 5/2000 | Friedewald et al. ........ 296/189 |
| 6,220,652 B1 | * | 4/2001 | Browne et al. ............. 296/188 |
| 6,302,473 B1 | * | 10/2001 | Weber ..................... 296/146.6 |

FOREIGN PATENT DOCUMENTS

| | | |
|---|---|---|
| DE | 22 23 880.8 | 5/1972 |
| EP | 987 169 A2 | 3/2000 |
| JP | 11 059182 A | 6/1999 |

OTHER PUBLICATIONS

European Search Report dated Mar. 17, 2003 (3 pages).

* cited by examiner

Primary Examiner—Stephen T. Gordon
Assistant Examiner—Gregory A. Blankenship
(74) Attorney, Agent, or Firm—Crowell & Moring LLP

(57) ABSTRACT

A body for a motor vehicle and a method of making same. The body includes a pair of side doors which are each provided with a reinforcing longitudinal frame part. The body includes an energy absorbing frame structure having cross members, forward, central and rearward side members, and a pair of A-columns and B-columns. First and second transmission devices are operatively arranged between the longitudinal frame part of each door and a respective A-column and B-column to achieve a closure between the door and the frame structure. The first and second transmission devices interact with the support structure to absorb and transmit forces acting upon the frame structure at least in the longitudinal direction of the vehicle.

23 Claims, 2 Drawing Sheets

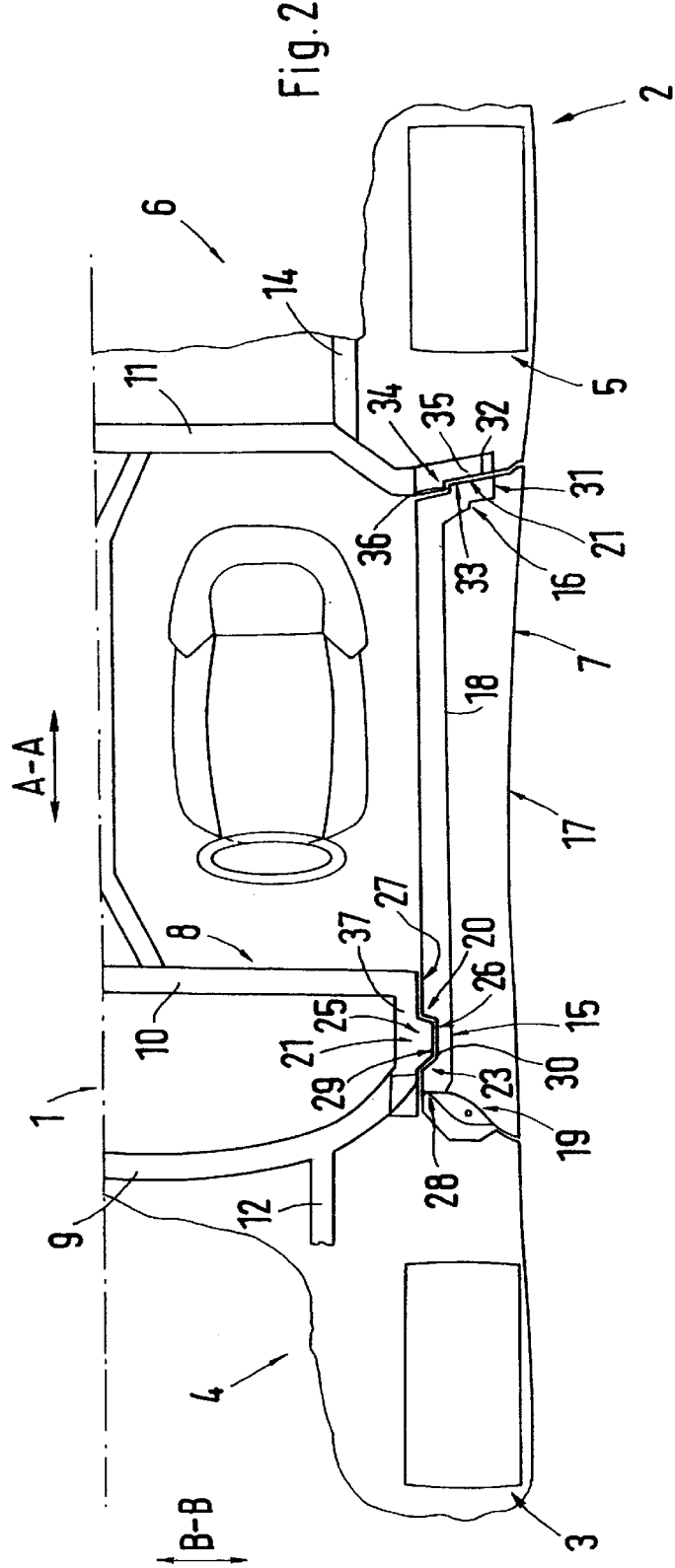
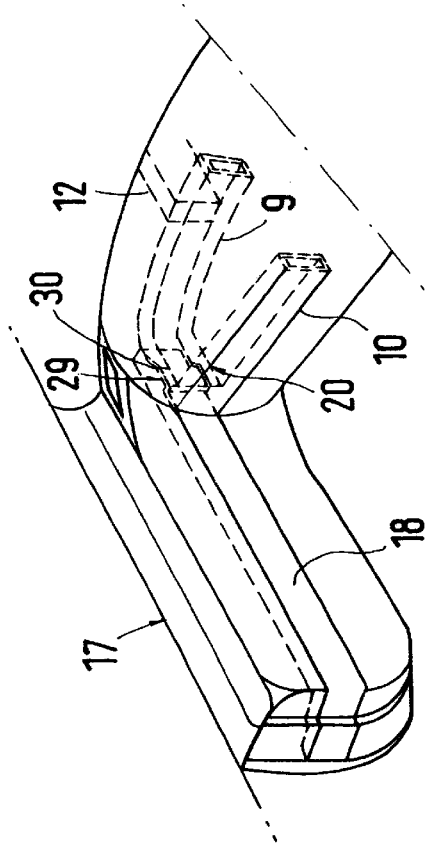

BODY FOR A MOTOR VEHICLE AND A METHOD OF MAKING SAME

BACKGROUND AND SUMMARY OF INVENTION

This application claims the priority of German Patent Document 100 42 409, filed Aug. 30, 2000, the disclosure of which is expressly incorporated by reference herein.

The invention relates to a body for a motor vehicle, particularly for a passenger car, and a method of making same.

The body includes side doors provided with reinforcing longitudinal frame parts and a frame structure which absorbs energy. The frame structure has cross members and forward as well as rearward side members extending between oppositely situated wheels and side members extending between wheels situated behind one another. A-columns constructed as hinge columns and B-columns constructed as lock columns are also integrated in the frame structure.

A known vehicle body of the initially mentioned type is disclosed in German Patent Document DE-OS 2 223 880 and comprises a closed construction in which a frame structure comprises side members between wheels which are situated opposite and behind one another and a roof unit which stiffens the vehicle body. At the longitudinal sides of the vehicle body, doors are provided which are reinforced by means of longitudinal frame parts. The latter are arranged between energy-absorbing members in the front end and rear of the frame structure. This construction has the disadvantage that no measures are taken between these members and the longitudinal frame parts to effectively transmit forces occurring in the event of a collision.

In European Patent Document EP 0 987 169 A2, a forward structure of a motor vehicle body is disclosed which has cross members, forward columns and side members. By way of the side members of the forward structure, impact forces are introduced into the vehicle body mainly by means of roof frame members and side members close to the ground, specifically without the aid of the doors or longitudinal roof frames integrated therein.

It is an object of the invention to provide a body for a motor vehicle, particularly a passenger car, whose frame structure is constructed such that under an impact stress affecting the vehicle body, a targeted flux of force takes place by way of the side members and the cross members, the columns and the doors, as well as their longitudinal roof frame parts.

According to the invention, this object is achieved by having each door with the longitudinal frame part, by way of transmission devices achieving a form closure and interacting with the frame structure comprising the side members, the cross members, and the A-column as well as the B-column such that the transmission devices absorb and transmit forces acting upon the frame structure at least in a longitudinal direction of the vehicle.

The principal advantages achieved by the features of the invention are that each door with the longitudinal frame part interacts by way of the transmission devices with the frame structure such that the flux of impact forces caused in the above-mentioned frame structure caused by an accident is optimized, specifically in the longitudinal direction of the vehicle and in the transverse direction of the vehicle. The position of the longitudinal frame part of the door above the side member extending between the wheels situated behind one another, ensures that accident-caused moments of impulse force are effectively supported and penetration situations of body components into the vehicle occupant compartment which may endanger occupants are clearly reduced. This arrangement is also suitable for superstructures of so-called open passenger cars or sportscars, where no jointly carrying roof frame structure is provided. In the case of superstructures which have a roof frame structure of this type, the above-mentioned arrangement can contribute to the fact that the roof frame and the side members can have a more light-weight construction. Finally, the transmission devices can be implemented in a simpler manner and can easily be taken into account when conceiving a vehicle body or a frame structure.

Other objects, advantages and novel features of the present invention will become apparent from the following detailed description of the invention when considered in conjunction with the accompanying drawings.

BRIEF DESCRIPTION OF DRAWINGS

FIG. 2 is an enlarged top view of the passenger car of FIG. 1; and

FIG. 3 is a diagonal view from the vehicle occupant compartment of the passenger car toward a door.

DETAILED DESCRIPTION OF THE DRAWINGS

Figure 1:
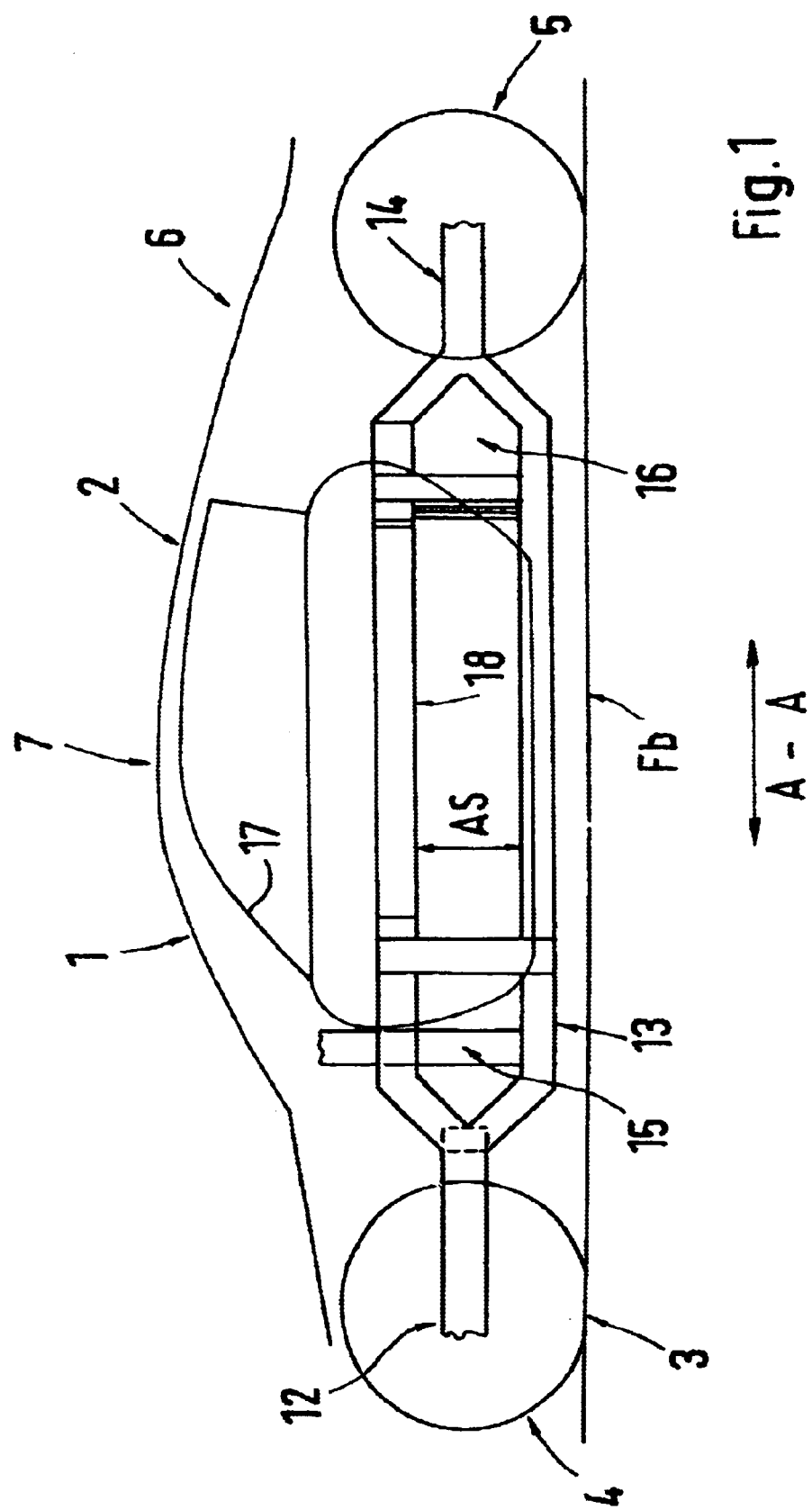
FIG. 1 is a schematic lateral view of a passenger car with the body according to the invention.

Referring to FIG. 1, a passenger car 1 comprising a vehicle body 2 which is carried by oppositely situated wheels 3 in the front end 4 and oppositely situated wheels 5 in the rear 6 is illustrated. A shell 7 surrounds a frame structure 8 (FIG. 2) of the vehicle body 2 which has a forward cross member 9, a forward vehicle occupant compartment cross member 10 and a rearward vehicle occupant compartment cross member 11, as well as forward, central and rearward side members 12, 13 and 14. The forward side members 12 and the rearward side members 14 extend between oppositely situated wheels 3 and 5 respectively, whereas the central side members 13 extend between the wheels 3 and 5 situated behind one another. Furthermore, hinge columns and lock columns are mounted on longitudinal sides of the frame structure 8 and are integrated in the latter, which columns will be called A-columns 15 and B-columns 16 hereinafter. A door 17 is linked to each A-column 15 and B-column 16. The door 17 is reinforced by way of a substantially horizontally aligned longitudinal frame part 18 and can be swivelled about a hinge 19 situated outside the A-column 15. The longitudinal frame part 18 extends at a distance As with respect to the central side member 13 which, in turn, extends adjacent to the road Fb.

The longitudinal frame part 18 of the door 17 interacts by way of first and second transmission devices 20 and 21 causing a form closure with the A-column 15 and the B-column 16 of the frame structure 8, which also comprises the side members 12, 13 and 14, as well as the cross member 9 and the vehicle occupant compartment cross members 10, 11. In this case, the first transmission device 20 and the second transmission device 21 are constructed such that they absorb and transmit forces acting in the longitudinal direction A—A and in the transverse direction B—B of the vehicle, as they occur, for example, in the case of damage caused by an accident. An advantageous construction is achieved if the first transmission device 20 is arranged in the area of the A-column 15 and the second transmission device 21 is arranged in the area of the B-column 16. In addition, the transmission devices 20 and 21 are provided with intermeshing sections 22, 23 and 24, 25 respectively.

The first transmission device 20 is formed by a first hat-shaped cross-sectional section 25 and a second hat-shaped cross-sectional section 26 whose edges 27, 28 are aligned in the longitudinal direction A—A of the vehicle. The first cross-sectional section 25 is a shaping-out 29 of the frame structure 8 or of the A-column 15, and the second cross-sectional section 26 is a shaping-in 30 in the door 17 or the longitudinal frame part 18.

However, it is also conceivable to provide the shaping-out 29 at the door 17 and the shaping-in 30 at the frame structure 8, as shown in FIG. 3.

The second transmission device 21 comprises a first frame support 31 on the door 17 and a second frame support 32 on the frame structure 8 or on the rearward vehicle occupant compartment cross member 11, which extend in the transverse direction B—B of the vehicle. The frame supports 31, 32 have boundaries 33, 34 which are provided with first stops 35 acting in the longitudinal direction A—A of the vehicle and with second stops 36 acting in the transverse direction of the vehicle B—B respectively.

The frame structure 8 is constructed such that in the area of the A-column 15 that a lateral frame section 37 aligned in the longitudinal direction A—A of the vehicle is connected with a forward cross member 9 arched in the driving direction C and with the forward vehicle occupant compartment cross member 10. The door 17 or the longitudinal frame part 18 extends laterally to the frame section 37. The side members 12 are connected to the forward cross member 9 and, viewed from the side, extend approximately in a longitudinal center plane D—D between the central side members 13 and the longitudinal frame parts 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body for a motor vehicle, comprising:
    side doors provided with reinforcing longitudinal frame parts, and
    a frame structure which absorbs energy and which has cross members and forward as well as rearward side members extending between oppositely situated wheels and side members extending between wheels situated behind one another, A-columns constructed as hinge columns and B-columns constructed as lock columns being integrated in the frame structure,
    wherein each door with the longitudinal frame part, by way of transmission devices achieving a form closure, interacts with the frame structure comprising the side members, the cross members and the A-column, as well as the B-column, such that the transmission devices absorb and transmit forces acting upon the frame structure at least in a longitudinal direction of the vehicle, and
    wherein a first of the transmission devices has a first hat-shaped cross-sectional section and a second hat-shaped cross-sectional section having edges aligned in the longitudinal direction of the vehicle.

2. The body according to claim 1, wherein the transmission devices absorb and transmit forces acting upon the frame structure in the longitudinal direction (A—A) and in a transverse direction (B—B) of the vehicle.

3. The body according to claim 1, wherein one of the side members extending on each longitudinal side of the body between wheels situated behind one another extends adjacent to a road and the longitudinal frame part is integrated in the door at a distance with respect to the side member.

4. The body according to claim 1, wherein a first of the transmission devices is provided in an area of the A-column and a second of the transmission devices is provided in an area of the B-column.

5. The body according to claim 1, wherein each of the transmission devices has intermeshing sections.

6. The body according to claim 1, wherein the first cross-sectional section has a shaping-out on the frame structure, and the second cross-sectional section has a shaping-in on the door.

7. The body according to claim 4, wherein the second transmission device has a first frame support and a second frame support which extend in the transverse direction (A—A) of the vehicle.

8. The body according to claim 1, wherein the frame structure is equipped in the area of the A-column with a forward cross member and with a forward vehicle occupant compartment cross-member arranged at a distance thereto and extending to lateral frame sections aligned in the longitudinal direction (A—A) of the vehicle.

9. The body according to claim 8, wherein the door laterally adjoins a respective frame section and a first of the transmission devices is provided between the frame section and the door.

10. The body according to claim 7, wherein the frame structure has a rearward vehicle occupant compartment cross member and rearward side members extending between the rear wheels, the second frame support being mounted on the rearward vehicle occupant compartment cross member.

11. A body for a motor vehicle, comprising:
    side doors provided with reinforcing longitudinal frame parts, and
    a frame structure which absorbs energy and which has cross members and forward as well as rearward side members extending between oppositely situated wheels and side members extending between wheels situated behind one another, A-columns constructed as hinge columns and B-columns constructed as lock columns being integrated in the frame structure,
    wherein each door with the longitudinal frame part, by way of transmission devices achieving a form closure, interacts with the frame structure comprising the side members, the cross members and the A-column, as well as the B-column, such that the transmission devices absorb and transmit forces acting upon the frame structure at least in a longitudinal direction of the vehicle,
    wherein a first of the transmission devices has a first hat-shaped cross-sectional section and a second hat-shaped cross-sectional section having edges aligned in the longitudinal direction of the vehicle,
    wherein the second transmission device has a first frame support and a second frame support which extend in the transverse direction (A—A) of the vehicle, and wherein mutually facing boundaries of the frame supports have stops respectively which act in the longitudinal direction (A—A) of the vehicle and in the transverse direction (B—B) of the vehicle.

12. A body for a motor vehicle, comprising:
    a pair of side doors each provided with a reinforcing longitudinal frame part;

an energy absorbing frame structure comprising cross members, forward, central and rearward side members, and a pair of A-columns and B-columns, the forward and rearward side members extending between pairs of forward and rearward wheels respectively and the central side members extending in a longitudinal direction of the vehicle between the forward and rearward wheels, the A-columns being operatively arranged as hinge columns and the B-columns being operatively arranged as lock columns; and first and second transmission devices operatively arranged between the longitudinal frame part of each door and the respective A-column and B-column to achieve a closure between the door and the frame structure, whereby the doors interact with the frame structure to absorb and transmit forces acting upon the frame structure at least in the longitudinal direction of the vehicle, and wherein the first transmission device comprises a first hat-shaped cross-sectional section and a second hat-shaped cross-sectional section having edges aligned in the longitudinal direction (A—A) of the vehicle.

13. The body according to claim 12, wherein the body is a passenger car body.

14. The body according to claim 12, wherein the transmission devices absorb and transmit forces acting upon the frame structure in a transverse direction (B—B) of the vehicle.

15. The body according to claim 12, wherein a side member extends on each longitudinal side of the vehicle body substantially parallel to a road (Fb), and the longitudinal frame part of each door extends at a distance (As) from one side member.

16. The body according to claim 12, wherein the first transmission device is provided in an area of the A-column and the second transmission device is provided in the area of the B-column.

17. The body according to claim 12, wherein each transmission device (20, 21) comprises intermeshing sections (22, 23 and 24, 25).

18. The body according to claim 12, wherein the first hat-shaped cross-sectional section comprises a shaping-out of the frame structure and the second cross-sectional section comprises a shaping-in of the door.

19. The body according to claim 16, wherein the second transmission device comprises a first frame support and a second frame support which extend in the transverse direction (A—A) of the vehicle.

20. The body according to claim 19, wherein the second frame support is mounted on a rearward cross member.

21. A body for a motor vehicle, comprising:

a pair of side doors each provided with a reinforcing longitudinal frame part;

an energy absorbing frame structure comprising cross members, forward, central and rearward side members, and a pair of A-columns and B-columns, the forward and rearward side members extending between pairs of forward and rearward wheels respectively and the central side members extending in a longitudinal direction of the vehicle between the forward and rearward wheels, the A-columns being operatively arranged as hinge columns and the B-columns being operatively arranged as lock columns; first and second transmission devices operatively arranged between the longitudinal frame part of each door and the respective A-column and B-column to achieve a closure between the door and the frame structure, whereby the doors interact with the frame structure to absorb and transmit forces acting upon the frame structure at least in the longitudinal direction of the vehicle, wherein the first transmission device is provided in an area of the A-column and the second transmission device is provided in the area of the B-column, wherein the second transmission device comprises a first frame support and a second frame support which extend in the transverse direction (A—A) of the vehicle, and wherein mutually facing boundaries of the frame supports comprise stops which act in the longitudinal direction (A—A) and in the transverse direction (B—B) of the vehicle.

22. The body according to claim 21, wherein in the area of the A-column, a forward cross member and a forward vehicle occupant compartment cross-member are arranged at a distance from one another and each extend to lateral frame sections aligned in the longitudinal direction (A—A) of the vehicle.

23. The body according to claim 22, wherein the door laterally adjoins a respective frame section and the first transmission device is provided between the frame section and the door.

* * * * *